United States Patent [19]

Montanvert

[11] 4,063,085
[45] Dec. 13, 1977

[54] METHOD OF AND APPARATUS FOR ELECTRONIC SCANNING

[75] Inventor: Michel Henri Montanvert, Grenoble, France

[73] Assignee: Cometa S. A., Montfleury, France

[21] Appl. No.: 628,345

[22] Filed: Nov. 3, 1975

[51] Int. Cl.$^2$ .......................................... G01D 21/04
[52] U.S. Cl. ................................ 250/221; 250/209; 340/258 B
[58] Field of Search ............... 250/221, 208, 209, 553; 340/258 B

[56] References Cited

U.S. PATENT DOCUMENTS

| | | | |
|---|---|---|---|
| 3,678,492 | 7/1972 | Casper | 340/258 B |
| 3,704,396 | 11/1972 | MacDonald | 250/221 |
| 3,723,737 | 3/1973 | Zeldman et al. | 250/221 |
| 3,781,842 | 12/1973 | Campman | 340/258 B |
| 3,789,384 | 1/1974 | Akers | 250/221 |
| 3,798,551 | 3/1974 | Cake | 340/258 B |
| 3,805,061 | 4/1974 | De Missimy et al. | 250/221 |
| 3,825,745 | 7/1974 | Thomson | 250/221 |
| 3,928,849 | 12/1975 | Schwarz | 250/221 |
| 3,970,846 | 7/1976 | Schofield et al. | 340/258 B |

Primary Examiner—Alfred E. Smith
Assistant Examiner—David K. Moore
Attorney, Agent, or Firm—Brisebois & Kruger

[57] ABSTRACT

The present invention relates to a method of and apparatus for electronic scanning of the kind in which an optical beam emitted and reflected on itself on a catadioptric mirror is displaced rapidly in space so as to sweep over a zone under control, the optical beam being formed by an electro-luminescent diode which projects a continuous train of optical impulses towards the catadioptric mirror, and said reflected impulses are received on a phototransistor device, the train of electrical impulses intended to excite an electro-luminescent diode and formed by a single preparation means being switched electronically in a cyclic manner, while at the same time the photo-transistor associated with the electro-luminescent diode in course of emission is rendered operative, the train of impulses being switched over from one diode to the next following at each impulse, characterized in that in order to ensure the state-by-state progression of the electronic switching circuit, each state validated by this circuit is compared with counting signals obtained independently of this circuit, and the continuation of the sequence is only permitted in the event of agreement, any disagreement due to a missed state or the stoppage of the selector causing the interruption of the sequence and the tripping of an alarm.

8 Claims, 3 Drawing Figures

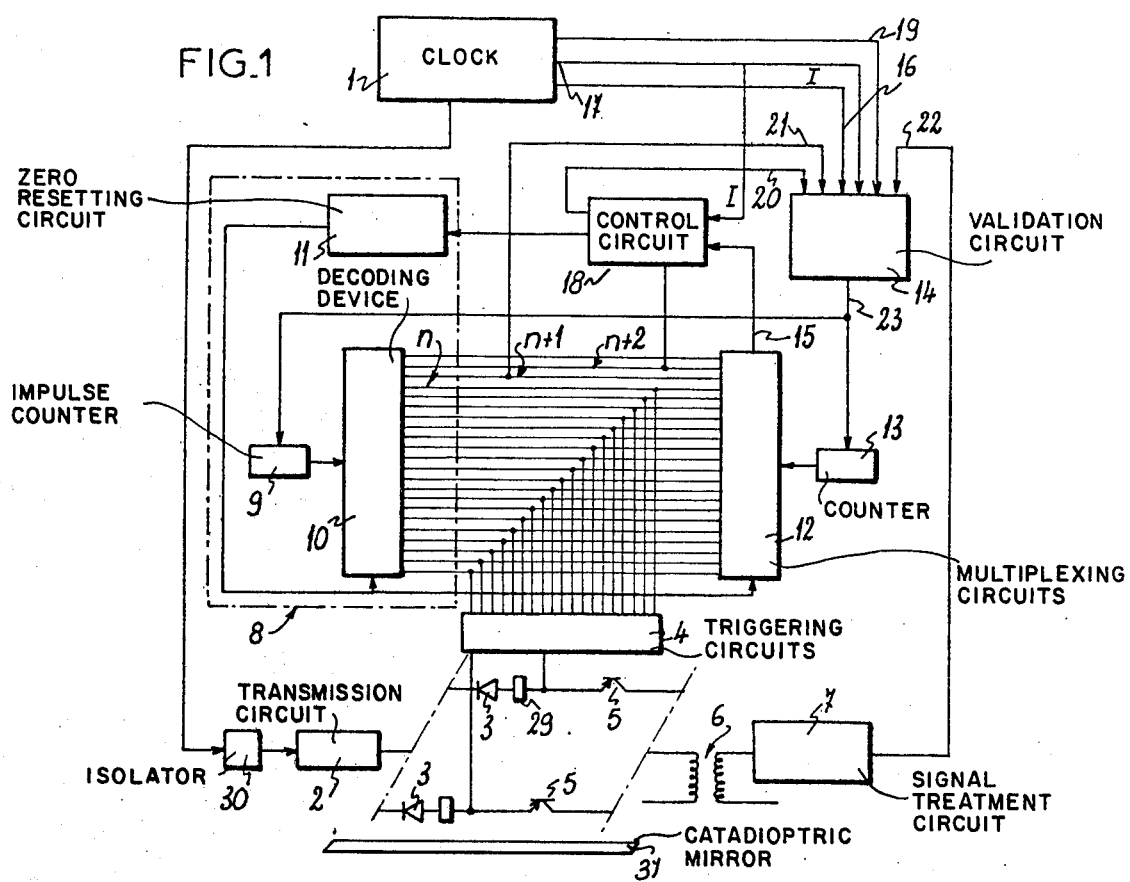
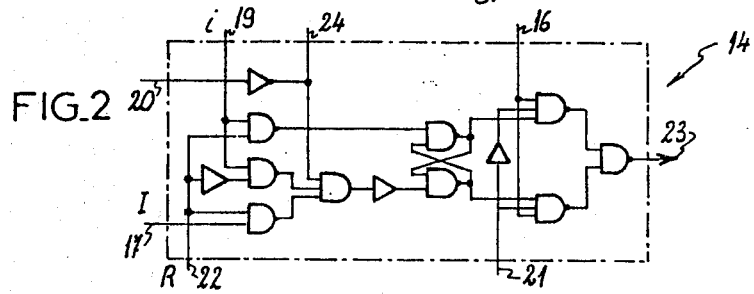
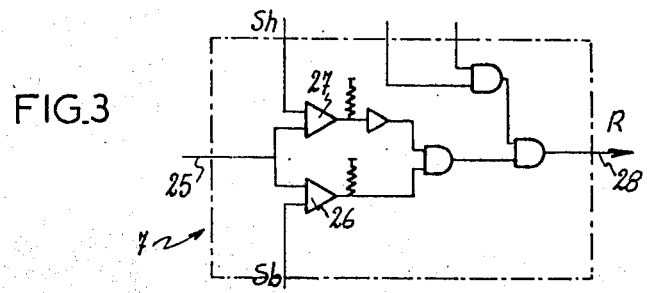

METHOD OF AND APPARATUS FOR ELECTRONIC SCANNING

The present invention relates to improvements effected in a method of photo-electric scanning of the kind in which an optical beam emitted and reflected on itself by a catadioptric mirror is displaced rapidly in space in such manner as to sweep over a zone under control, and in which the optical beam is formed by an electro-luminescent diode projecting a continuous train of optical impulses towards the reflector of the catadioptric type, and in which the reflected impulses are received on a photo-tranisitor.

French patent application No. 2,135,819 has for its object a method of this kind, characterized in that the train of electrical impulses intended to excite an electro-luminescent diode and formed by a single preparation means are switched electronically and cyclically towards each of the said electro-luminescent diodes, while at the same time the photo-transistor associated with the electro-luminescent diode in course of emission is rendered operative.

The train of impulses is for example switched from one diode to that next following at each impulse. This method of operation is especially desirable because it necessitates only weak impulses in order to render operative or inoperative a last supply stage of an electro-luminescent diode or the first amplification stage of the signal received on a photo-transistor.

French patent application No. 2,135,819 also relates to a photo-electric scanning device for carrying this method into effect. The device described is of the kind comprising a plurality of transmitting electro-luminescent diodes and receiving photo-transistors, each being associated with a respective supply stage of the signal to be transmitted or for releasing the signal received.

This device is characterized in that it comprises a single preparation circuit for the electrical impulses to be transmitted to the electro-luminescent diodes, a single treatment circuit for the signals received by all the phototransistors, and an electronic switching circuit comprising as many outputs as there are electro-luminescent diodes, each output being connected on the one hand to the supply stage of an electro-luminescent diode, and on the other hand to the release or triggering stage of the photo-transistor associated therewith.

Other characteristic features are indicated in the French patent application No. 2,135,819 referred to above, and these refer particularly to the detail of the electronic switching circuit.

Thus, it is provided that:

The electronic switching circuit may be of the type withdecades and a decimal decoding device, synchronized with the preparation circuit of the electrical impulses.

The above-mentioned decoding device may comprise as many outputs as there are transmitter-receiver cells, each being connected to a coincidence circuit supplied on the one hand by the transmission impulse, the said circuit ensuring the conduction of a transistor ensuring the excitation of an electro-luminescent diode during the periods of coincidence.

Each output of the decimal decoding device is connected to a transistor which releases a photo-transistor.

In addition, in order to ensure the treatment of signals emitted by the photo-transistors by means of a single circuit, there is advantageously provided a preparation circuit for a train of reference impulses synchronuous with the transmitted electrical impulses, connected to a comparator which is further connected to the receiving circuit of the impulses from the photo-transistors.

The method and the arrangement presented above permit a cyclic switching at very high frequency, and they may be applied to "photo-electric gates" of large dimensions, having a considerable number of transmitter-receiver cells which may furthermore be arranged spatially in any suitable ways.

The applications which especially concern the protection of staff working in front of a dangerous machine, for example a press: A vertical photo-electric gate is then interposed between the press and the operator, and any penetration through this gate causes the almost instantaneous locking of the press. In order to prevent any accident, it is essential that the scanning device should operate in an irreproachable manner.

The object of the present invention is thus to provide, especially for this kind of application, a method and a device for controlling the correct operation of the apparatus which enable a high degree of confidence to be placed in the unit. These controls give rise to the use of the ideas concerning alarms and faults as defined below:

The alarm is the fact that the photo-electric barrier has either been interrupted or that a control device has revealed a fault in the apparatus.

The fault is constituted by the failure of a circuit or of a component part of the apparatus.

The precise object of the invention is to provide the means which permit the following controls to be effected:

1. Control of the electronic switching circuit previously referred to so as to make sure of the state by state forward movement of the selector, an alarm signal being actuated if a state has been passed over, which would cause a gap in the light barrier, or if the selector no longer rotates, which would amount to the same thing as having a carrier constituted by only one single beam.

2. Control of the second order, intended to ensure at each cycle of the switching circuit that the device providing the first control is in working order, so as to be able to have a high degree of confidence in the unit.

3. Control of the logic circuits in order to ensure their correct operation.

4. Control of the reception level of the detectors, especially with the alarm operation of the system if this level is too high. This control is very important and renders the barrier completely inviolable. In fact, when the barrier is set for a certain width, the return signal on the detectors normally has a pre-determined amplitude. If a user wishes to render the barrier inoperative, he has a tendency to place a reflector against the detectors so as to work without protection. However, the presence of this reflector placed at a short distance for the purpose of reducing the width of the barrier has the consequence of causing an increase in the amplitude of the signals analyzed, which is put to advantage in order to create this last safety device.

The invention thus has essentially for its object a method of photo-electric scanning as described in French patent application No. 2,135,819, in which, in order to ensure the state by state forward movement of the electronic switching circuit, each state validated by the said circuit is compared with independently obtained counting signals for the said circuit and the continuation of the sequence is permitted only in the event of agreement, any disagreement coming from a jumped condition or from a stoppage of the selector causing the stopping of the sequence and the operation of the alarm.

In a preferred form of execution of this method, a voluntary fault is injected at each scanning cycle and during a supplementary state of this cycle, and the starting of a new cycle is permitted only if this fault is detected.

It is this deliberately induced fault which permits the control of the second order previously referred to. This fault is advantageously created by sending to the selector a special impulse causing the change of level. This change corresponds to the jumping over of a state and it will thus be clear that the alarm is then operated According to another characteristic feature of the invention, a test of the logic circuits is carried out at each scanning cycle, during another supplementary state, by verifying the absence of reception of a reflected signal during this state.

Finally, the level of the reflected signals is advantageously compared with a high threshold, slightly higher than their normal level, in such manner as to cause the alarm not only in the case of cutting-off the light barrier, but also in the case of modification tending to render the said barrier inoperative.

The invention is also directed to a device for carrying into effect the method of control previously defined, in which device the outputs of the decoding device are connected to the corresponding inputs of multiplexing circuits controlled by an auxiliary counter working in parallel with the main counter controlling the decoding device.

The above-mentioned multiplexing circuits only permit the continuation of the sequence when there is agreement between the information given by the auxiliarycounter and that supplied by the decoding device.

According to a preferred form of embodiment, permitting the control of the second order, a control circuit is interposed between the output of the multiplexers and the zero-resetting circuit of the selector, the said circuit being connected to an additional output of the decoding device corresponding to a supplementary state excited at each cycle.

According to a further characteristic feature of the device of the invention, the logic validation circuit of the main and auxiliary counters is connected to a supplementary output of the decoding device corresponding to another supplementary state excited at each cycle and to an output of a reception circuit receiving the signals coming from the detectors, the validation of the counters being not effected if the reception circuit sends a signal during this supplementary state.

In any case, the invention will be more clearly understood by means of the description which follows below, with reference to the accompanying diagrammatic drawings representing, by way of example and without any restriction, one form of embodiment of this scanning device. In the drawings:

FIG. 1 is a general view in the form of a block diagram showing the whole of the scanning device with its control circuits in accordance with the invention;

FIG. 2 is a partial and detailed view showing one of the control circuits of the device of FIG. 1;

FIG. 3 is a partial and detailed view showing another control circuit of the same device.

The device shown in a very diagrammatic manner in FIG. 1 combines the functions already described in French patent application No. 2,135,819 and the additional functions which form the subject of the present invention.

Thus, as already described in French patent application No. 2,135,819, a clock 1 constituted by a multivibrator controls the whole of the device and in particular a transmission circuit 2 coupled with a plurality of electro-luminescent diodes 3, together with the circuits 4 ensuring the successive triggering of a plurality of phototransistors 5 in relation, through the intermediary of a high-frequency transformer 6, with a single signal-treatment circuit 7, which is also known as a reception circuit.

Each photo-transistor 5 is associated with one of the electro-luminescent diodes 3 in such manner as to receive the optical beam from this diode, reflected by a catadioptric mirror 40, the electro-luminescent diode-photo-transistor assembly forming a unit known as the transmitter-receiver cell.

The various cells are excited in succession and in a cyclic manner in order to produce a high-frequency scanning effect by means of an electronic switching circuit 8 which makes it possible to transmit in a cyclic manner a triggering or releasing control signal on each of its outputs, in relation with the triggering circuits 4. The switching circuit 8 is controlled in turn by the clock 1 and it comprises in particular a binary impulse counter 9 followed by a decimal decoding device 10 constituting a scanning selector, and also a zero-resetting circuit 11.

The decimal outputs of the decoding device 10, connected to the various triggering circuits 4 are further connected, according to the present invention, to the inputs of circuits 12, known as multiplexers, which receive through other inputs the binary information coming from a second counter 13 which is operated in parallel with the main counter 9 by a common validation circuit 14.

These two counters 9 and 13 normally receive the same number of impulses and contain the same binary value, and one of the outputs of the decoding device 10 is validated. The multiplexing circuits 12 receiving the binary values of the second counter 13 analyze the state of their decimal inputs corresponding to the state validated by the decoding device 10. If there is agreement between the state validated by the decoding device 10 and the binary value introduced into the multiplexers 12, these latter permit the continuation of the sequence, by the information which they supply at their output 15 in relation with the circuit 14 ensuring the validation of the counters.

On the other hand, if the main counter 9 or the decoding device 10 are defective and for example jump over a state, which would cause a gap in the light barrier, the multiplexing circuits 12 would immediately reveal the fault and would effect the stoppage of the sequence and the alarm information. Similarly, if the decoding device 10 stops on a given state, for example following the stoppage of the main counter 9 or the blocking of the decoding device 10, which corresponds to a linear barrier no longer having the form of a layer, the multiplexers 12 give the order to stop the sequence and release the alarm.

In addition to the normal control of the counters over the channel 16, the clock 1 still delivers, over a channel 17 and at each validation of state, an impulse I of short duration which is injected into an input of the decoding device 10 in such manner as to effect a change of level on its decimal outputs. This test serves to verify that there is no short-circuit or other continuous state (open circuit) at the output of the decoding device, in which case the change of state does not take place, so that the sequence is stopped and the alarm is released.

The control means previously indicated are themselves checked, at each cycle of the switching circuit 8 during a control of the second order permitted by providing in the decoding device 10, a number of states greater than the number $n$ of the transmitter-receiver cells. Thus, a the state $n = 2$, that is to say two states after the validation of the last detector, the impulse I is again sent, and there is employed a control circuit 18 interposed between the output 15 of the multiplexers 12 and the zero-resetting circuit 11.

This impulse is blocked according to the change of level as already indicated, which produces a voluntary fault. For this reason, the comparison between the decoding device 10 and the multiplexers 12 gives a disagreement result which causes the return to zero of the decoding device 10 and the multiplexers 12, so as to enable them to begin a new scanning cycle. In the case where this voluntary fault were not detected, the control circuit 18 prevents the re-setting to zero, and the selectors remain blocked at the state $n = 2$, which actuates an alarm.

During normal working, this circuit 14 ensures the transmission of impulses to the input of the counters 9 and 13. This logic circuit, shown in detail in FIG. 2, comprises a certain number of NAND gates and inverters, the detail of which has not been given and there are indicated simply the various inputs of this circuit, which receives:

over the channel 16, the control impulses of the counters coming from the clock 1;
by the channel 17, the impulses I coming from the clock 1;
by another channel 19, impulses $i$ also coming from the clock 1;
by an input 20, fault signals coming from the control circuit 18;
by an input 21, signals coming from the output $n + 1$ of the decoding device 10;
by a last input 22, the information coming from the reception circuit 7.

The output 23 of the circuit 14 supplies the two counters 9 and 13, and another output 24 supplies the zero-resetting circuit 11.

It is desirable to ensure the correct operation of these logic circuits. In fact, it is possible that, in consequence of a blocking of one of these circuits in a given state, the control impulses from the counters exist continuously at the output 23, whereas circuits located upstream (for example the receiver 7 which supplies the input 22) prevent the passage of these impulses.

It is precisely in order to carry out this control that the state $n + 1$, that is to say the state which immediately follows the validation of the last detector, is utilized so as to ensure that there is in fact no reception, which is normal since there is no detector activated. The control impulse from the counters is then only supplied to the output 23 if there is no reception at the state $n + 1$. In the contrary case, the decoding device 10 is blocked and the alarm is actuated.

A last control is concerned with the reception circuit 7, the detail of which can be seen from FIG. 3. This circuit enables the signal $s$ coming from the detectors through an input 25 to be compared with two reference values, which are:

A lower threshold other than zero, which makes it possible to determine whether there is reflection of the beam on the reflector while providing freedom from the background noise inherent in the system; this threshold is represented by a reference voltage $Sb$ injected into the input of a lower threshold comparator 26.

An upper threshold which prevents the barrier from being rendered inoperative; this threshold is represented by a second reference voltage $Sh$ injected into the input of a high-threshold comparator 27.

The reception signal R, obtained at the output 28 of the circuit 7, is directed towards the input 22 of the circuit 14 previously described, which ensures the validation of the counters. Three cases are possible:

a. If the barrier is cut-off, the signal $s$ coming from the detectors verifies the inequality $s < Sb$, which results in a level 0 for the signal R.
b. If the barrier is free, the signal $s$ verifies the double inequality $Sb < s < Sh$, which gives the level 1 for the signal R.
c. If the reflected signal is too large, or if $s > Sh$, the output signal R is at the level 0.

In other words, only the case (b) in which the signal $s$ is located between the low threshold and the high threshold is interpreted as normal reception, the other two cases (a) and (c) causing automatically the actuation of the alarm.

During the starting-up of the apparatus, a sensitivity adjustment is necessary in order that the normal signal $s$ may be slightly less than the high threshold $Sh$. On the other hand, the ratio $Sb/Sh$ is chosen by construction to be approximately ½ which means that it is considered that cut-off of the barrier takes place (case (a)) for a reduction of a signal of 50% at the level of the detectors. This makes it possible:

to cause cutting-off of the barrier with an object of small size, irrespective of its position inside the barrier.
to make the apparatus inviolable, especially by preventing its neutralization by means of a reflector placed against the detector ramp, since this artifice causes an increase in the signal level accompanied by corresponding over-stepping of the high level.

Thus, by virtue of the additional control circuits which have been described above and which are added to the basic circuits necessary for the operation already described in French patent application No. 2,135,819, there is obtained an apparatus having a maximum degree of safety, attained especially by the fact that the majority of the control circuits are themselves controlled.

In addition, for complete safety, the immunity against parasites of all the logic portion, made with circuits of the TTL type is increased by static isolators 29 and 30, shown in FIG. 1, for example of the optical-electronic coupler type which ensure perfect galvanic isolation between the low-level signals of the logic circuits and the strong current circulating in the electro-luminescent diodes.

It is obvious that the alarm information, as this has been defined in the preamble, must automatically and immediately cause the stoppage of the machine in order to protect the operator, whether this alarm is tripped by the overstepping of the barrier or by the failure of a component or a sub-assembly of the apparatus.

It will of course be understood that the invention is not restricted to the single form of embodiment of this control device, completing a scanning arrangement, which has been described above by way of example and without limitation; it includes on the contrary, all the alternative forms of construction in which slightly different circuits carry out the same functions in order to achieve the same results.

What I claim is:

1. A method of controlling a scanning luminous barrier system comprising
    providing a series of electro-luminescent diodes, and associating a series of phototransistors respectively with said electro-luminescent diodes,
    triggering said diodes in sequence to emit a light pulse, and simultaneously triggering the associated phototransistors in sequence to enable the phototransistors to sense a light pulse,
    reflecting the light pulse from each diode to its associated phototransistor for detection,
    simultaneously pulsing a multi state switching circuit and a multi state comparison circuit,
    triggering said diodes and phototransistors in response to the state of said switching circuit,
    providing a first control step, said first control step including comparing the state of the switching circuit with the state of the comparison circuit to determine agreement between the states of these circuits and continuing triggering of the electro-luminescent diodes and phototransistors only upon a condition of agreement of the states of the switching circuit and comparison circuit,
    providing a second control step, said second control step including monitoring signals indicating reception of light pulses by the phototransistors and stopping the scanning if the signal monitored indicates reception of light pulses by the phototransistors during a time period in which said diodes are not to be triggered,
    providing a third control step, said third control step including changing the state of said switching circuit during a time period in which said diodes are not to be triggered while maintaining the state of the comparison circuit and continuing the scanning only if there is disagreement between the levels of the comparison circuit and the switching circuit, and
    providing a fourth control step, said fourth control step including monitoring the level of the light pulses sensed at the phototransistors, providing an indication of signal from the phototransistors only if the level monitored is within a predetermined range of levels, and stopping sequencing in the absence of indication of signal from the phototransistors.

2. The process of claim 1 wherein said second control step further includes providing a first supplementary state, in addition to the number of states required for triggering said diodes, after the sequence of triggering said diodes and wherein said monitoring of the signals occur at the time of said first supplementary state.

3. The process according to claim 1 in which said changing the state during said third control step includes sending an impulse to the switching circuit to cause the switching circuit to skip a state while preventing the impulse from changing the state of the comparison circuit.

4. The process according to claim 1 wherein said predetermined range of levels is between an upper threshold level slightly above the normal phototransistor output level and a lower threshold level slightly below the normal phototransistor level.

5. A scanning luminous barrier system comprising
    a plurality of electro-luminescent diodes for producing light outputs,
    a plurality of phototransistors, one associated with each of said diodes for producing an output in response to a light input,
    reflecting means for reflecting light from each of the diodes onto its associated phototransistor,
    control means for producing control pulses,
    switching means comprising $n$ output means, wherein $n$ is the number of diodes, responsive to the control pulses for state-by-state triggering in sequence of each diode and its corresponding phototransistor so that a scanning effect is produced, and further comprising a first and a second supplementary output means for providing first and second additional states respectively at the end of each state-by-state triggering sequence during the time when no diode is to be triggered,
    auxiliary counting means operated in parallel with the switching means for counting control pulses,
    comparison means connected to the output means for comparing the state of the auxiliary counting means with the state of the switching means, and
    means for terminating the state-by-state triggering upon a discrepancy between the state of the auxiliary counting means and the state of the switching means during the triggering sequence.

6. The system of claim 5 further comprising
    a control circuit for resetting the switching means to begin a new state-by-state triggering sequence and connected to the first supplementary output,
    phototransistor signal responsive means operably connected to the control circuit means for preventing resetting of said switching means in the event of a phototransistor output at the time of said first additional state.

7. Device of claim 5 further comprising
    signal injecting means for energizing the second supplementary output of the switching means without increasing the count of the auxiliary counter to simulate a skipped state, and
    control circuit means connected to the comparison means for preventing further state-by-state triggering cycles if the comparison means fails to determine a discrepancy between the state of the auxiliary counting means and the state of the switching means during simulation of the skipped state.

8. The system of claim 6 further comprising phototransistor responsive means comprising a threshold detector having an upper threshold only slightly above the normal output of the phototransistors.

* * * * *